(12) United States Patent
Aihara (10) Patent No.: US 12,326,192 B2
(45) Date of Patent: Jun. 10, 2025

(54) GASKET

(71) Applicant: NOK CORPORATION, Tokyo (JP)

(72) Inventor: Kazuya Aihara, Nihonmatsu (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 17/923,268

(22) PCT Filed: May 26, 2021

(86) PCT No.: PCT/JP2021/019926
§ 371 (c)(1),
(2) Date: Nov. 4, 2022

(87) PCT Pub. No.: WO2021/241615
PCT Pub. Date: Dec. 2, 2021

(65) Prior Publication Data
US 2023/0235820 A1    Jul. 27, 2023

(30) Foreign Application Priority Data

May 28, 2020  (JP) ................................. 2020-093376

(51) Int. Cl.
*F16J 15/08*  (2006.01)

(52) U.S. Cl.
CPC ................. *F16J 15/0818* (2013.01)

(58) Field of Classification Search
CPC ... F16J 15/0818; F16J 15/0825; F16J 15/0831
See application file for complete search history.

(56) References Cited

U.S. PATENT DOCUMENTS 5,568,932 A * 10/1996 Tanaka ................. F16J 15/0825
                                                              277/595
5,626,348 A *  5/1997 Takada ................. F16J 15/0825
                                                              277/593

(Continued)

FOREIGN PATENT DOCUMENTS

CN     1486406 A    3/2004
CN     1488047 A    4/2004

(Continued)

OTHER PUBLICATIONS

Notice of Reasons for Refusal issued in corresponding Japanese Patent Application No. 2022-526602 dated Sep. 5, 2023, with English translation (9 Pages).

(Continued)

*Primary Examiner* — Eugene G Byrd
*Assistant Examiner* — L. Susmitha Koneru
(74) *Attorney, Agent, or Firm* — Harness, Dickey & Pierce, P.L.C.

(57) ABSTRACT

A gasket is provided to reduce a reaction force in an attached state and suppress deterioration of sealing performance due to a corrosive foreign matter such as salty water and a snow melting agent. A gasket includes a metal base plate made of metal, and a covering layer formed of an elastic body that covers at least a part of the metal base plate. The metal base plate includes a pair of an upper face and a lower face that are back-to-back to each other, a bead portion protruding toward a side facing the upper face, an inner periphery portion extending from an inner periphery edge of the bead portion, and an outer periphery portion extending from an outer periphery edge of the bead portion. The outer periphery portion extends toward a side facing the lower face, in an oblique manner with respect to a protruding direction of the bead portion.

6 Claims, 10 Drawing Sheets

(56) References Cited

U.S. PATENT DOCUMENTS

| | | | | |
|---|---|---|---|---|
| 5,639,101 A | * | 6/1997 | Tanaka | F16J 15/0825 |
| | | | | 277/593 |
| 7,793,942 B2 | * | 9/2010 | Sakamoto | F16J 15/0825 |
| | | | | 277/593 |
| 2001/0052674 A1 | * | 12/2001 | Egloff | F02F 11/002 |
| | | | | 277/591 |
| 2004/0164497 A1 | | 8/2004 | Ueta et al. | |
| 2004/0217552 A1 | * | 11/2004 | Sueda | F16J 15/0825 |
| | | | | 277/592 |
| 2005/0285352 A1 | | 12/2005 | Ueta et al. | |
| 2006/0103077 A1 | * | 5/2006 | Sakamoto | F16J 15/0825 |
| | | | | 277/591 |
| 2011/0254232 A1 | * | 10/2011 | Takeda | F16J 15/0825 |
| | | | | 277/591 |
| 2014/0097576 A1 | * | 4/2014 | Hirayama | F16J 15/0825 |
| | | | | 277/591 |
| 2014/0203523 A1 | | 7/2014 | Anzai et al. | |
| 2015/0204270 A1 | * | 7/2015 | Davidson | F16J 15/0825 |
| | | | | 219/121.64 |
| 2015/0211637 A1 | | 7/2015 | Aihara et al. | |
| 2015/0252887 A1 | * | 9/2015 | Tosa | F16H 57/029 |
| | | | | 277/639 |
| 2016/0010665 A1 | * | 1/2016 | Schoellhammer | F15B 13/081 |
| | | | | 285/120.1 |
| 2016/0305548 A1 | | 10/2016 | Watanabe et al. | |
| 2018/0252309 A1 | * | 9/2018 | Blersch | F16H 61/0009 |
| 2018/0335142 A1 | * | 11/2018 | Watanabe | F16J 15/0818 |
| 2019/0003594 A1 | * | 1/2019 | Oohinata | F16J 15/0806 |
| 2020/0032904 A1 | * | 1/2020 | Tanji | F16J 15/0831 |

FOREIGN PATENT DOCUMENTS

| | | | | |
|---|---|---|---|---|
| CN | 105909792 A | | 8/2016 | |
| CN | 110382931 A | | 10/2019 | |
| EP | 937924 A2 | * | 8/1999 | ........... F16J 15/0818 |
| JP | 2002-195099 A | | 7/2002 | |
| JP | 2013-036607 A | | 2/2013 | |
| JP | 2013-061002 A | | 4/2013 | |
| JP | 2015-169290 A | | 9/2015 | |
| JP | 2016-156448 A | | 9/2016 | |
| JP | 6178036 B1 | | 8/2017 | |

OTHER PUBLICATIONS

International Preliminary Report on Patentability for corresponding International Application No. PCT/JP2021/019926 dated Jul. 27, 2021, with English translation (9 Pages).

Written Opinion for corresponding International Application No. PCT/JP2021/019926 dated Jul. 27, 2021, with English translation (8 Pages).

International Search Report (English and Japanese) issued in PCT/JP2021/019926, mailed Jul. 27, 2021; ISA/JP (5 pages).

Extended European Search Report issued in corresponding European Patent Application No. 21812008.7 dated May 24, 2024 (8 Pages).

First Notice of Examination Opinion issued in corresponding Chinese Patent Application No. 202180032982.0 dated Dec. 26, 2024, with English translation (7 Pages).

* cited by examiner

PRIOR ART

FIG.11

PRIOR ART

GASKET

CROSS REFERENCE TO RELATED APPLICATIONS

This application is a U.S. National Phase Application under 35 U.S.C. 371 of International Application No. PCT/JP2021/019926, filed on May 26, 2021, which claims priority to Japanese Patent Application No. 2020-093376, filed on May 28, 2020. The entire disclosures of the above applications are expressly incorporated by reference herein.

BACKGROUND

Technical Field

The present disclosure relates to a gasket, in particular to a gasket used in a vehicle, a general-purpose machine, or the like.

Related Art

In a vehicle or a general-purpose machine, for example an automobile, a gasket is used for an engine, a device accommodating an electronic component, and the like for sealing a housing. The gasket goes through elastic-plastic deformation in a state of being compressively sandwiched between a pair of members, which form a housing in combination, whereby a gap between the pair of members is sealed and the housing is hermetic. An automobile may travel in a shore area and an area where a snow melting agent is scattered, and in such a case, salty water or the snow melting agent may stick to a component of the automobile and may enter and accumulate in a gap between the members sandwiching the gasket. The accumulating salty water or snow melting agent may cause corrosion of the members sandwiching the gasket. In a case where the members sandwiching the gasket is formed of an aluminum alloy, due to high ionization tendency of aluminum, the members sandwiching the gasket is highly likely to be corroded by the accumulating salty water or snow melting agent. In a case where the corroded part exceeds a seal line of the gasket, the sealing function of the gasket is reduced or lost. Therefore, a component in which a gasket is used is subjected to the salt spray test in advance for evaluation of the corrosion resistance function. In the salt spray test, in the component to which a gasket is attached, salty water is accumulated in a gap between members sandwiching the gasket and the component is placed in a dry condition and a wet condition alternately, to evaluate the corrosion resistance function against salty water.

As described above, in order to suppress reduction of sealing function of the gasket due to a corrosive foreign matter such as salty water and the snow melting agent, the members sandwiching the gasket is preferably not corroded by the corrosive foreign matter. Given this, a gasket structure has been conventionally proposed for suppressing corrosion of the members sandwiching the gasket due to the corrosive foreign matter.

Figure 9:
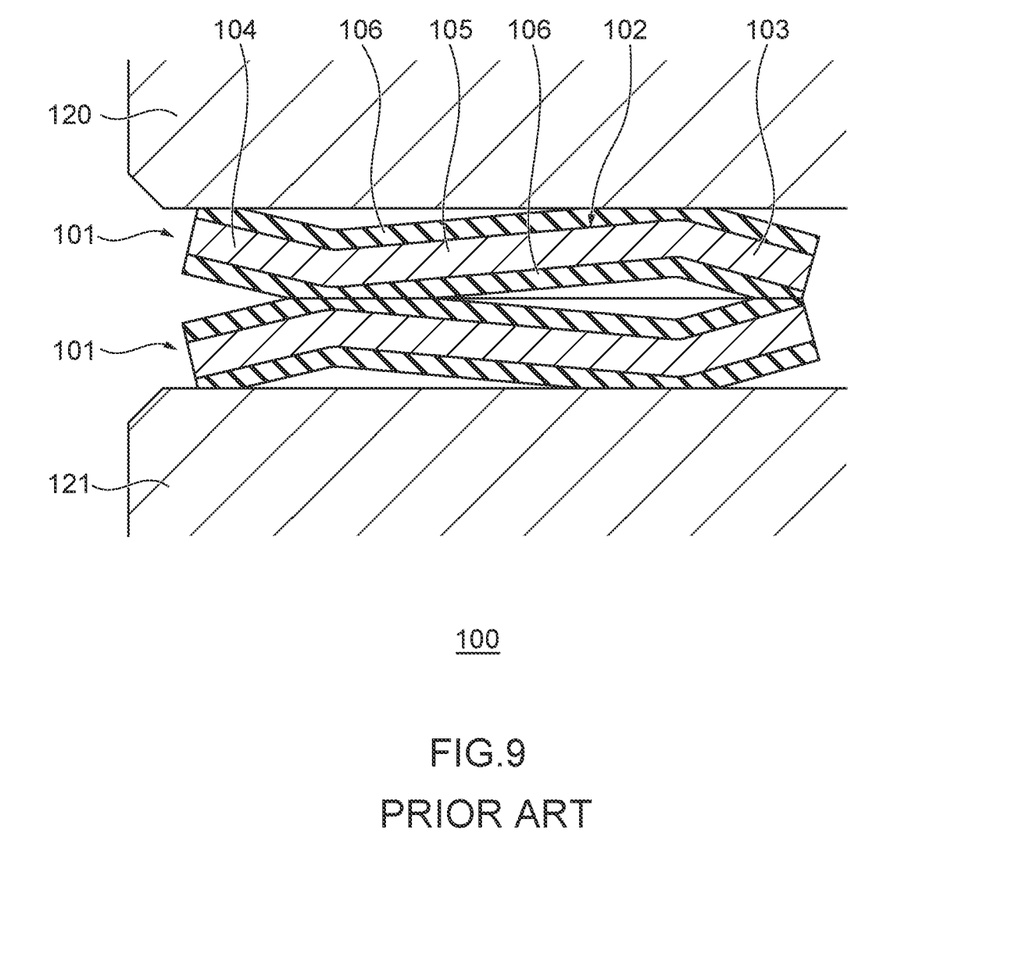
FIG. 9 is a partial cross-sectional view illustrating a schematic structure of a conventional gasket.

For example, Japanese Patent Application Publication No. 2013-36607 discloses a gasket structure 100 used in a state in which two metal gaskets 101 facing each other are sandwiched between a pair of members 120, 121 as shown in FIG. 9. The metal gasket 101 includes: a metal base plate 102 formed of an inner periphery portion 103 and an outer periphery portion 104 extending in parallel with each other in a free state not being sandwiched and a bead portion 105 extending obliquely between the inner periphery portion 103 and the outer periphery portion 104; and a rubber layer 106 that covers an upper face and a lower face of the metal base plate 102. In the gasket structure 100, the outer periphery portion 104 of the upper metal gasket 101 is in contact with the upper side member 120 via the rubber layer 106, and the outer periphery portion 104 of the lower metal gasket 101 is in contact with the lower side member 121 via the rubber layer 106 as shown in FIG. 9, whereby a space for accumulation of the corrosive foreign matter such as salty water between the pair of members 120, 121 is reduced, to suppress corrosion of the members 120, 121 due to the corrosive foreign matter.

Figure 10:
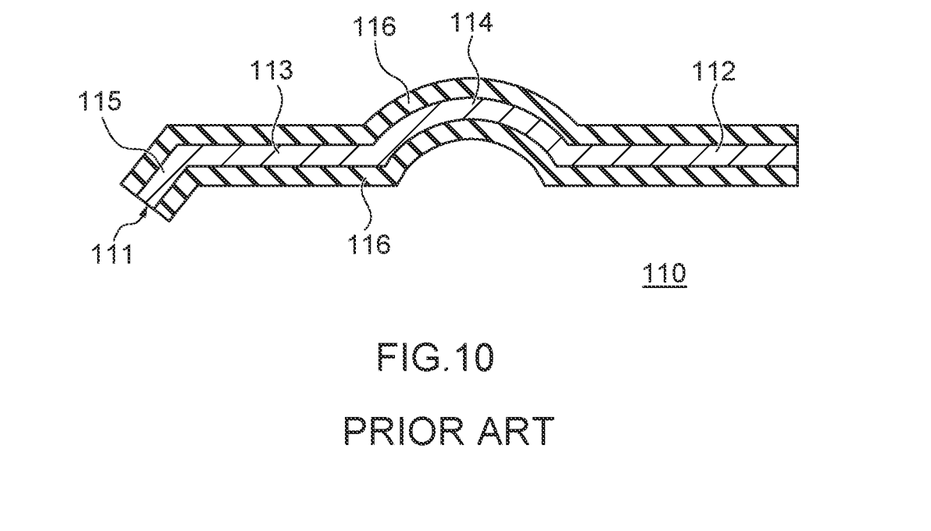
FIG. 10 is a partial cross-sectional view illustrating a schematic structure of another conventional gasket.
Figure 11:
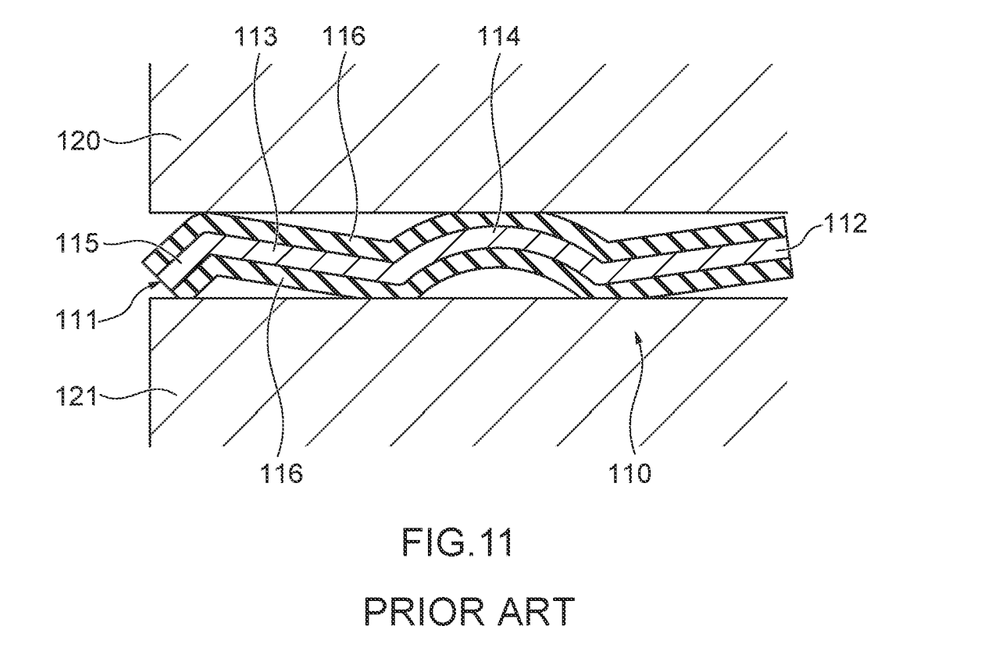
FIG. 11 is a partial cross-sectional view of another conventional gasket in an attached state.

In addition, Japanese Patent Application Publication No. 2013-61002 discloses a gasket 110 provided with a metal base plate 111 and a rubber layer 116 covering upper and lower faces of the metal base plate 111 as shown in FIG. 10. In the gasket 110, the metal base plate 111 includes: an inner periphery portion 112 and an outer periphery portion 113 extending in parallel to each other in a free state; a full-bead shaped bead portion 114 extending between the inner periphery portion 112 and the outer periphery portion 113 and protruding upward; and a bent portion 115 formed by bending downward an end portion on the outer periphery side of the outer periphery portion 113. In an attached state, the gasket 110 is sandwiched between a pair of members 120, 121, with the outer periphery side end of the outer periphery portion 113 and the bead portion 114 being in contact with the upper side member 120 via the rubber layer 116, and the inner periphery side end of the outer periphery portion 113, the outer periphery side end of the inner periphery portion 112, and the outer periphery side end of the bent portion 115 being in contact with the lower side member 121 via the rubber layer 116 as shown in FIG. 11. As described above, the gasket 110 reduces a space for accumulation of the corrosive foreign matter such as salty water between the pair of members 120, 121, to suppress corrosion of the members 120, 121.

The above-described conventional gasket structure 100 and gasket 110 enables suppression of corrosion of the members 120, 121 sandwiching these. However, in the gasket structure 100, the pair of metal gaskets 101 facing each other are sandwiched in the attached state and thus exert a great reaction force, leading to the need of a great fastening force for fastening the members 120, 121. In addition, in the gasket 110, the full-bead shaped bead portion 114 and the bent portion 115 are compressively sandwiched in the attached state and thus the sandwiched gasket 110 exerts a great reaction force, leading to the need of a great fastening force for fastening the members 120, 121. As described above, some of the conventional gaskets enables suppression of corrosion of the members attached thereto, but requires a great fastening force for fastening the members.

Therefore, for the conventional gasket, a structure has been demanded that enables reduction of the reaction force in the attached state and suppression of deterioration of the sealing performance due to the corrosive foreign matter such as salty water and the snow melting agent. In addition, for the conventional gasket, a structure has been demanded that enables further reduction of a gap between the members sandwiching the gasket in which the corrosive foreign matter may accumulate.

The present disclosure has been made in view of the above problems and an objective thereof is to provide a gasket that enables reduction of the reaction force in the attached state and prevention of deterioration of the sealing performance due to the corrosive foreign matter such as salty water and the snow melting agent.

SUMMARY

In order to attain the above-described objective, the gasket according to the present disclosure includes a metal base plate made of metal, and a covering layer formed of an elastic body that covers at least a part of the metal base plate, comprising: the metal base plate includes a pair of faces that are back-to-back to each other, a bead portion which is a portion protruding toward a side facing one face of the pair of faces, an inner periphery portion which is a portion extending from an edge on an inner periphery side of the bead portion, and an outer periphery portion extending from an edge on an outer periphery side of the bead portion; and the outer periphery portion extends toward a side facing another face of the pair of faces, in an oblique manner with respect to a protruding direction of the bead portion.

In the gasket according to an aspect of the present disclosure, the outer periphery portion extends along a plane.

In the gasket according to an aspect of the present disclosure, the outer periphery portion extends along a curved face protruding toward the side facing the other face, having a curvature smaller than a curvature of the bead portion.

In the gasket according to an aspect of the present disclosure, the inner periphery portion extends toward a side facing another face of the pair of faces, in an oblique manner with respect to a protruding direction of the bead portion.

In the gasket according to an aspect of the present disclosure, at least a part of the inner periphery portion is formed in a symmetric manner to at least a part of the outer periphery portion with respect to the bead portion.

Effects of Disclosure

The gasket according to the present invention enables reduction of the reaction force in the attached state and suppression of deterioration of the sealing performance due to the corrosive foreign matter such as salty water and the snow melting agent.

DETAILED DESCRIPTION

Hereinafter, an embodiment of the present disclosure is described with reference to the drawings.

Figure 1:
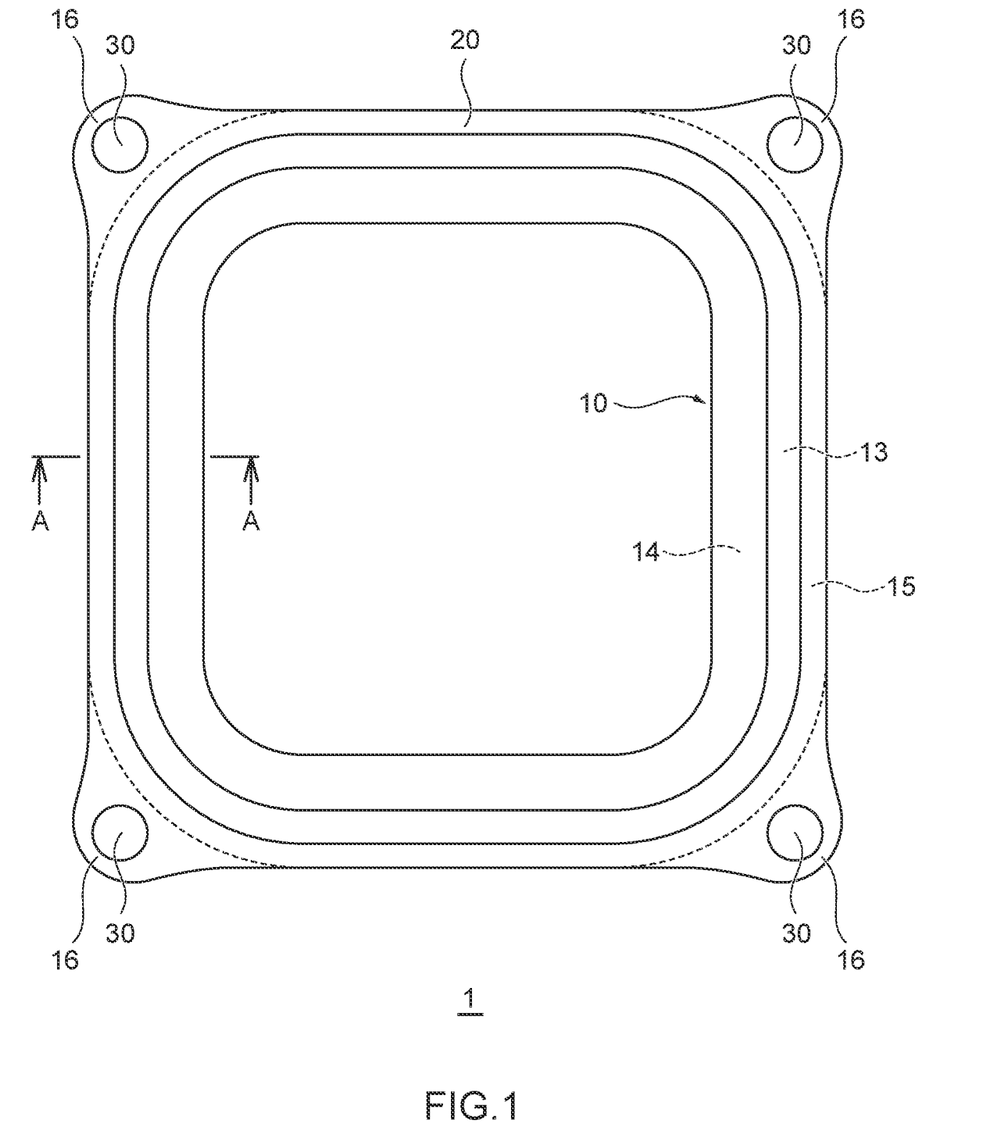
FIG. 1 is a planar view illustrating a schematic structure of a gasket according to a first embodiment of the present disclosure.
Figure 2:
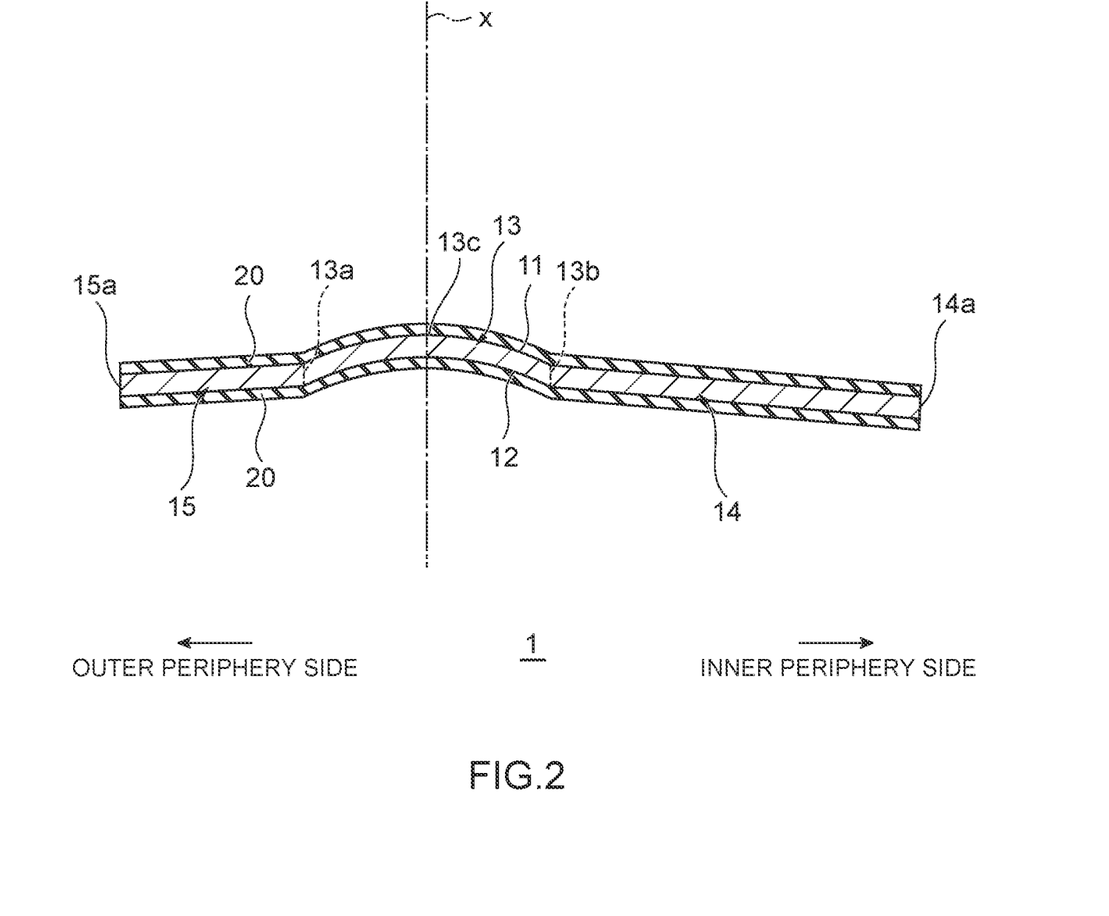
FIG. 2 is a cross-sectional view along a line A-A of the gasket in FIG. 1.

FIG. 1 is a planar view illustrating a schematic structure of a gasket 1 according to a first embodiment of the present disclosure, and FIG. 2 is a cross-sectional view illustrating a cross section of the gasket 1 shown in FIG. 1, illustrating a cross section along the line A-A orthogonal to an extending direction of the gasket 1 (hereinafter, may be also merely referred to as cross section). The gasket 1 is used in a vehicle, a general-purpose industrial equipment, and the like, and goes through elastic-plastic deformation in a state of being compressively sandwiched between two members to seal a gap between the two members. The gasket 1 is, for example in an engine room and the like of an automobile, sandwiched between two members forming a housing accommodating an electronic part and the like to seal the housing, whereby the electronic part and the like are shielded from the corrosive foreign matter such as salty water and the snow melting agent. FIGS. 1 and 2 illustrate the gasket 1 in a free state not being sandwiched between the members.

As shown in FIGS. 1 and 2, the gasket 1 is a gasket including a metal base plate 10 made of metal, and a covering layer 20 formed of an elastic body that covers at least a part of the metal base plate 10. The metal base plate 10 includes a pair of faces 11, 12 that are back-to-back to each other, a bead portion 13 which is a portion protruding toward a side facing one face (face 11) of the pair of faces, an inner periphery portion 14 which is a portion extending from an edge on an inner periphery side of the bead portion 13, and an outer periphery portion 15 extending from an edge on an outer periphery side of the bead portion 13. The outer periphery portion 15 extends toward a side facing another face (face 12) of the pair of faces, in an oblique manner with respect to a protruding direction of the bead portion 13. Hereinafter, the gasket 1 is specifically described.

Note that, the inner periphery side refers to a side of a closed space surrounded by the annular gasket 1 (interior side) as shown in FIG. 2, and the outer periphery side refers to a side of a space not closed by the annular gasket 1 as shown in FIG. 2, an exterior side opposite to the inner side. In addition, for the sake of description, the upper side is the upper side and the lower side is the lower side in FIG. 2. The upper side and the lower side are indicated for the sake of description, and do not specify the attached attitude of the gasket 1.

As shown in FIG. 1, the gasket 1 is a plate-like member extending in an annular shape, and more specifically formed to extend in a rectangular annular shape in a plan view. The shape of the gasket 1 in a plan view is not limited to a rectangular shape and may be another shape. In addition, in the gasket 1, a bolt hole 30 is formed, which is a through hole through which a bolt is inserted for fastening the two members which are attachment targets, such that the gasket 1 is sandwiched between the members.

The metal base plate 10 is, specifically, a plate-like member having a uniform or substantially uniform thickness, formed from an elastic metal material. The metal base plate 10 forms the gasket 1, and in the present embodiment, is formed to extend in a rectangular annular shape in a plan view. The metal base plate 10 may be formed of either one elastic metal plate, or a plurality of elastic metal plates being laminated. As the metal material for the metal base plate 10, stainless steel, cold rolled steel, galvanized steel, an aluminum alloy, or the like may be used. The bead portion 13, the inner periphery portion 14, and the outer periphery portion 15 are formed by processing the metal plate by pressing or forging, integrally from the same metal material.

In addition, the metal base plate 10 has an upper face 11 and a lower face 12 as the above-described pair of faces. The upper face 11 and the lower face 12 are back-to-back with each other in the thickness direction of the metal base plate 10 as shown in FIG. 2, the upper face 11 being directed to the upper side and the lower face 12 being directed to the lower side. In addition, on a cross section, outlines formed by the upper face 11 and the lower face 12 are symmetric or substantially symmetric across a center line connecting the center of the metal base plate 10 in the thickness direction.

The bead portion 13 is a portion of the metal base plate 10 protruding to the upper side to which the upper face 11 is directed, and forms a bead in the gasket 1. Specifically, as shown in FIG. 2, the bead portion 13 protrudes toward the upper side on a protruding direction line x, which is a line extending in the protruding direction of the bead portion 13, the upper face 11 forms a curved face that is convex upward, and the lower face 12 forms a curved face that is concave upward. The bead portion 13 extends, for example, along an arc of constant curvature in the cross section. The bead portion 13 may not extend along an arc of constant curvature in the cross section.

As shown in FIG. 2, in the cross section, the bead portion 13 has a symmetric or substantially symmetric shape across the protruding direction line x. In the cross section, the bead portion 13 may not have a symmetric shape across the protruding direction line x. In a case where, in the cross section, the bead portion 13 does not have a symmetric shape across the protruding direction line x, the protruding direction line x may be a line (normal line) orthogonal to an apex portion 13c of the bead portion 13. Note that the apex portion 13c of the bead portion 13 is a portion positioned on the uppermost side of the bead portion 13 in the protruding direction of the bead portion 13, or this portion with a portion in the vicinity thereof.

Figure 3:
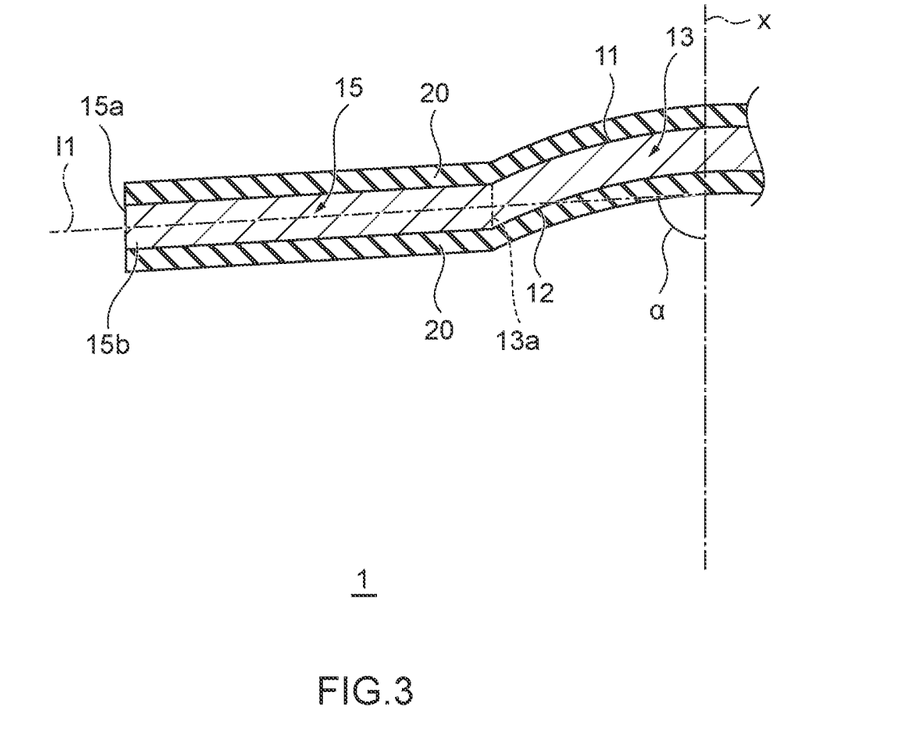
FIG. 3 is a partial enlarged cross-sectional view illustrating an outer periphery portion of the gasket shown in FIG. 2 in an enlarged manner.

The outer periphery portion 15 extends by a predetermined width from an edge on the outer periphery side (outer periphery edge 13a) of the bead portion 13 toward the outer periphery side, as shown in FIGS. 1 and 2. As described above, the outer periphery portion 15 extends downward in an oblique manner with respect to the protruding direction of the bead portion 13 (protruding direction line x). In other words, the outer periphery portion 15 is a tapered portion. Specifically, as shown in FIG. 2, the outer periphery portion 15 extends along a plane. For example, in the cross section, the outer periphery portion 15 extends linearly from the outer periphery edge 13a of the bead portion 13. In addition, in the cross section, the outer periphery portion 15 extends downward in an oblique manner with respect to the protruding direction line x. More specifically, as shown in FIG. 3, in the cross section, an extending direction line l1 connecting the center of the outer periphery portion 15 in the thickness direction is linear, and a contained angle α on the lower side formed by the extending direction line l1 and the protruding direction line x is smaller than 90°.

The outer periphery portion 15 may not extend linearly as described above. Specifically, the extending direction line l1 extending in the extending direction of the outer periphery portion 15 may not be linear, and may be substantially linear. In this case as well, as described above, the outer periphery portion 15 extends downward in an oblique manner with respect to the protruding direction of the bead portion 13 (protruding direction line x). In other words, as shown in FIG. 3, in the cross section, the contained angle α on the lower side formed by the extending direction line l1 and the protruding direction line x of the outer periphery portion 15 is smaller than 90°.

Figure 4:
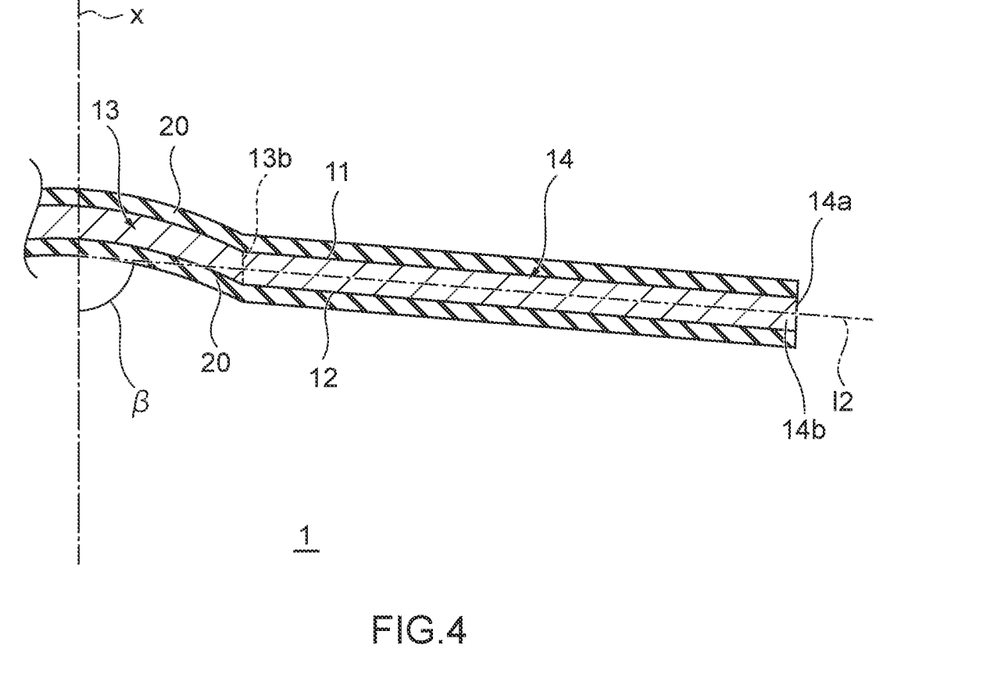
FIG. 4 is a partial enlarged cross-sectional view illustrating an inner periphery portion of the gasket shown in FIG. 2 in an enlarged manner.

The inner periphery portion 14, similarly to the outer periphery portion 15: forms a tapered portion; extends by a predetermined width from an edge on the inner periphery side (inner periphery edge 13b) of the bead portion 13 toward the inner periphery side, as shown in FIGS. 1 and 2; and extends downward in an oblique manner with respect to the protruding direction of the bead portion 13 (protruding direction line x). Specifically, as shown in FIG. 2, the inner periphery portion 14 extends along a plane. For example, in the cross section, the inner periphery portion 14 extends linearly from the inner periphery edge 13b of the bead portion 13. In addition, in the cross section, the inner periphery portion 14 extends downward in an oblique manner with respect to the protruding direction line x. More specifically, as shown in FIG. 4, an extending direction line l2 connecting the center of the inner periphery portion 14 in the thickness direction in the cross section is linear, and a contained angle β on the lower side formed by the extending direction line l2 and the protruding direction line x is smaller than 90°.

The inner periphery portion 14 may not extend linearly as described above. Specifically, the extending direction line l2 extending in the extending direction of the inner periphery portion 14 may not be linear, and may be substantially linear. In this case as well, as described above, the outer periphery portion 15 extends downward in an oblique manner with respect to the protruding direction of the bead portion 13 (protruding direction line x). In other words, as shown in FIG. 4, in the cross section, the contained angle β on the lower side formed by the extending direction line l2 of the inner periphery portion 14 and the protruding direction line x is smaller than 90°.

In the gasket 1, at least a part of the inner periphery portion 14 is formed in a symmetric manner to at least a part of the outer periphery portion 15 with respect to the bead portion 13. Specifically, a length of the inner periphery portion 14 in the extending direction (extending direction line l2) is greater than a length of the outer periphery portion 15 in the extending direction (extending direction line l1), and in the cross section, a part of the inner periphery portion 14 on the bead portion 13 side is symmetric to the entirety of the outer periphery portion 15 with respect to the protruding direction line x as shown in FIG. 2. In addition, the outer periphery portion 15 and the inner periphery portion 14 are inclined with respect to the protruding direction line x in a similar manner to each other, and the contained angle α between the extending direction line l1 of the outer periphery portion 15 and the protruding direction line x is the same as the contained angle β between the extending direction line l2 of the inner periphery portion 14 and the protruding direction line x.

The length of the inner periphery portion 14 in the extending direction and the length of the outer periphery portion 15 in the extending direction may be the same. In this case, in the cross section, the entirety of the inner periphery portion 14 and the entirety of the outer periphery portion 15 are symmetric with respect to the protruding direction line x. In addition, the length of the outer periphery portion 15 in the extending direction may be greater than the length of the inner periphery portion 14 in the extending direction, and in the cross section, a part of the outer periphery portion 15 on the bead portion 13 side may be symmetric to the entirety of the inner periphery portion 14 with respect to the protruding direction line x. In addition, the outer periphery portion 15 and the inner periphery portion 14 may not be inclined with respect to the protruding direction line x in a similar manner to each other, and the contained angle α between the extending direction line l1 of the outer periphery portion 15 and the protruding direction line x may not be the same as the contained angle β between the extending direction line l2 of the inner periphery portion 14 and the protruding direction line x. For example, the contained angle α between the extending direction line l1 of the outer periphery portion 15 and the protruding direction line x may be greater or smaller than the contained angle β between the extending direction line l2 of the inner periphery portion 14 and the protruding direction line x.

The covering layer 20 is, as described above, an elastic body covering at least a part of the metal base plate 10. In the present embodiment, the covering layer 20 covers the entire upper face 11 and the entire lower face 12 of the metal base plate 10 as shown in FIG. 2. In other words, the covering layer 20 covers the bead portion 13, the inner periphery portion 14, and the outer periphery portion 15 in an integral manner from the upper side and the lower side. The covering layer 20 does not cover the edge of the inner periphery portion 14 on the inner periphery side (inner periphery edge 14a) and the edge of the outer periphery portion 15 on the outer periphery side (outer periphery edge 15a). Note that the covering layer 20 may cover a part or all of the inner periphery edge 14a of the inner periphery portion 14, and the covering layer 20 may cover a part or all of the outer periphery edge 15a of the outer periphery portion 15.

The elastic body forming the covering layer 20 may be an elastic body formed of synthetic rubber. The synthetic rubber is exemplified by synthetic rubber containing at least one of nitrile rubber (NBR), styrene butadiene rubber (SBR), fluorine-containing rubber (FKM), acrylic rubber (ACM), and silicon rubber. The covering layer 20 has a uniform or substantially uniform thickness in the cross section, and is formed in a film shape or a sheet shape and attached to the metal base plate 10 as shown in FIG. 2. Alternatively, the elastic body for the covering layer 20 may be foamed rubber.

The covering layer 20 is attached to the metal base plate 10 by an adhesive, for example. Between the metal base plate 10 and a layer of the adhesive, an underlying treatment layer may be formed by an underlying treatment of the surface of the metal base plate 10. The underlying treatment may be, for example, a zinc phosphate treatment.

In the gasket 1, a circumference of a portion where the bolt hole 30 is formed has a greater width than other portions as shown in FIG. 1. The bolt hole 30 is formed in a bolt hole section 16, which is a portion of the metal base plate 10 extending from the outer periphery edge 15a of the outer periphery portion 15 to the outer periphery side. The bolt hole section 16 has such an area that the bolt hole 30 can be formed as shown in FIG. 1. The gasket 1 is formed such that a shape of a cross section orthogonal to the extending direction of the gasket 1 is uniform or substantially uniform in the extending direction of the gasket 1, except for the portion where the bolt hole section 16 is formed. Note that the gasket 1 may have, in the portion where the bolt hole section 16 is not formed, a portion where the shape of the cross section orthogonal to the extending direction of the gasket 1 is not uniform in the extending direction of the gasket 1.

Figure 5:
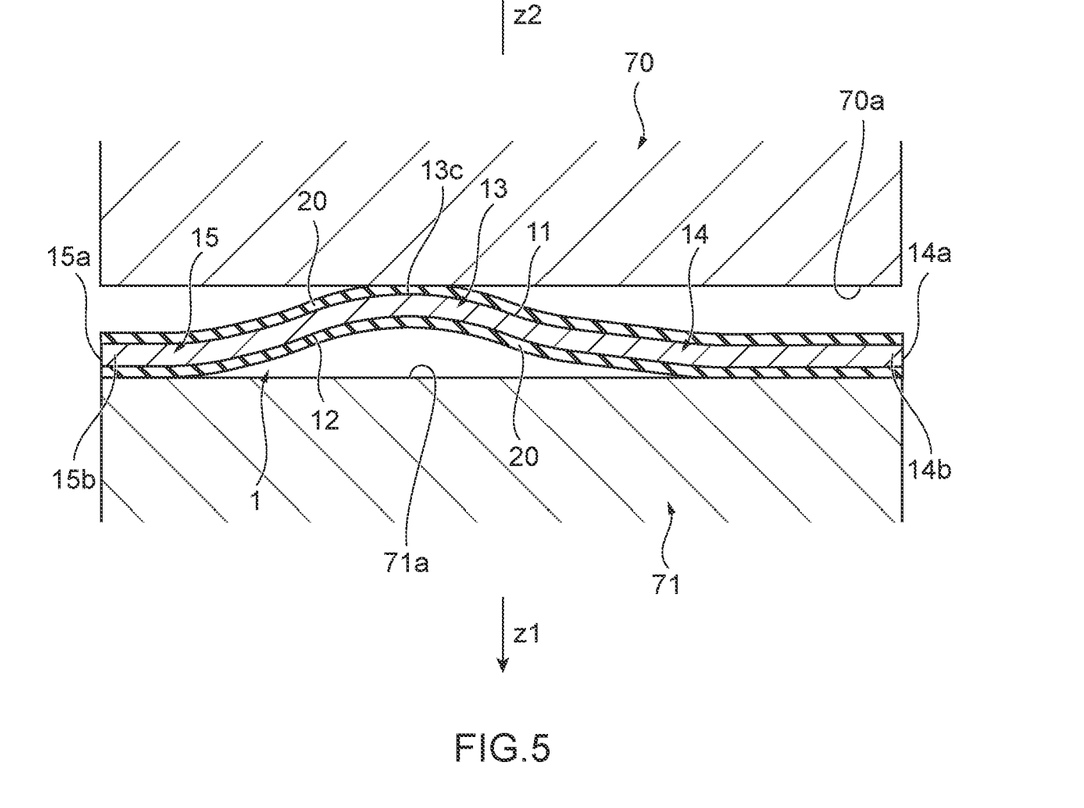
FIG. 5 is a cross-sectional view illustrating the gasket shown in FIG. 1 in an attaching process.
Figure 6:
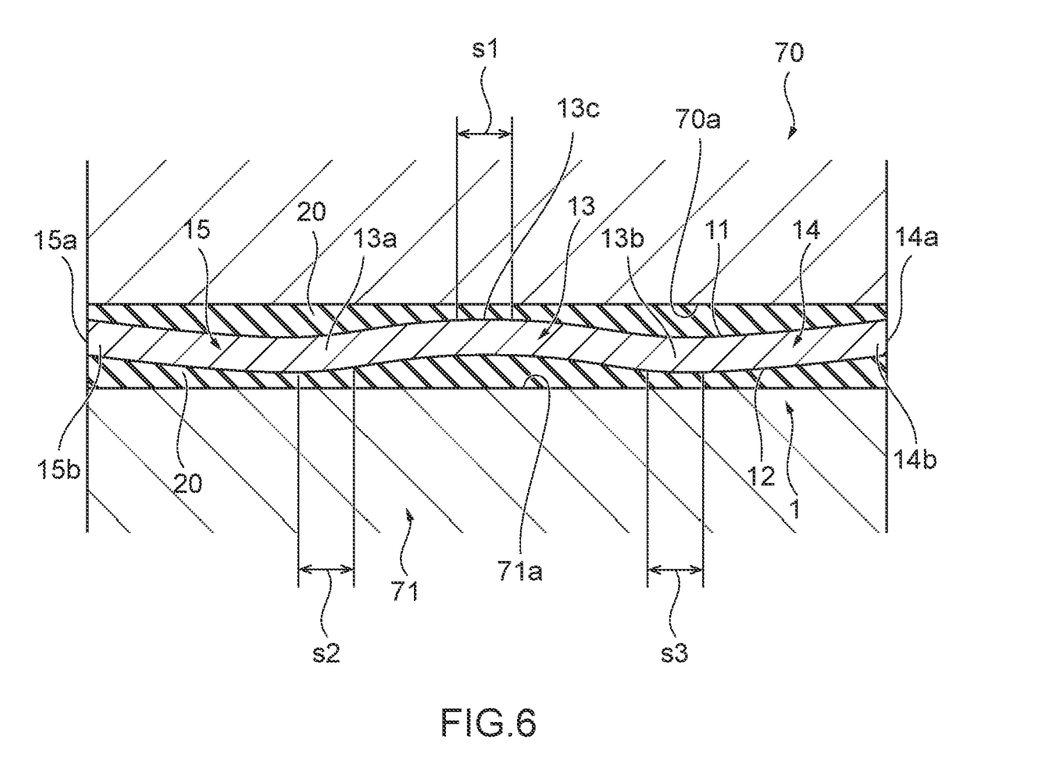
FIG. 6 is a cross-sectional view illustrating the gasket shown in FIG. 1 in an attached state.

Next, a function of the gasket 1 is described. FIG. 5 is a cross-sectional view illustrating the gasket 1 in an attaching process to an attachment target, and FIG. 6 is a cross-sectional view illustrating the gasket 1 in an attached state attached to the attachment target. In the attached state, the gasket 1 is sandwiched between the two members 70, 71 which are the attachment targets and goes through elastic-plastic deformation in a state of being compressed between the members 70, 71, to seal the gap between the members 70, 71. Specifically, the member 70 and the member 71 are fastened in a state in which a plane 70a formed on the member 70 and a plane 71a formed on the member 71 face each other, while the gasket 1 goes through elastic-plastic deformation in a state of being compressed between the plane 70a and the plane 71a. The members 70, 71 are, for example, members forming: a cylinder block and a cylinder head of an engine; a cylinder block and an oil pan of an engine; a case for a fuel cell stack; and a housing for other devices, and the planes 70a, 71a are formed in, for example, flange potions formed in the members 70, 71.

The gasket 1 is elastically-plastically deformed from the free state shown in FIG. 2 during the attaching process of fastening the members 70, 71, and the fastening is performed until a predetermined contact pressure is generated at a contact point (seal line) between the members 70, 71. The fastening is performed by, for example, screwing a bolt.

In the attaching process, while the members 70, 71 are being fastened, the bead portion 13 contacts (surface contact) the plane 70a of the upper side member 70 via the covering layer 20 and is compressed to the lower side (in the direction of an arrow z1 in FIG. 5). Meanwhile, the outer periphery edge 15a and the vicinity thereof (hereinafter referred to as "outer periphery end portion 15b") on the lower face 12 of the outer periphery portion 15 contacts the plane 71a of the lower side member 71 via the covering layer 20 and is compressed to the upper side (in the direction of an arrow z2 in FIG. 5). Meanwhile, the inner periphery edge 14a and the vicinity thereof (hereinafter referred to as "inner periphery end portion 14b") on the lower face 12 of the inner periphery portion 14 contacts the plane 71a of the member 71 via the covering layer 20 and is compressed to the upper side (in the direction of the arrow z2 in FIG. 5). As a result, as shown in FIG. 5, the metal base plate 10 goes through elastic-plastic deformation, the bead portion 13 extends to the outer periphery side and the inner periphery side, and inclinations of the inner periphery portion 14 and the outer periphery portion 15 with respect to the bead portion 13 (with respect to the protruding direction line x) increase, that is, the contained angles α, β increase, whereby the height of the metal base plate 10 reduces. Note that the height of the metal base plate 10 is the height of the metal base plate 10 in the direction of the protruding direction line x.

During the fastening process, when the fastening force of the members 70, 71, in other words an axial force of the bolt, reaches a predetermined set value, the gasket 1 is in a state of generating a desired reaction force, and the gasket 1 is in the attached state when the fastening of the members 70, 71 is completed. In this attached state, as shown in FIG. 6, the upper side covering layer 20 in the apex portion 13c of the bead portion 13 and the vicinity thereof contacts the plane 70a, whereby the lower side covering layer 20 in the outer periphery edge 13a of the bead portion 13 and the vicinity thereof and the lower side covering layer 20 in the inner periphery edge 13b of the bead portion 13 and the vicinity thereof are in contact with the plane 71a (full compressed state). As a result, in the full compressed state, three seal lines s1, s2, s3 are formed by the bead portion 13 as shown in FIG. 6. The seal line s1 is a seal line formed through contact between the upper side covering layer 20 in the apex portion 13c of the bead portion 13 and the vicinity thereof, and the plane 70a. The seal line s2 is a seal line formed through contact between the lower side covering layer 20 in the outer periphery edge 13a of the bead portion 13 and the vicinity thereof, and the plane 71a. The seal line s3 is a seal line formed through contact between the lower side covering layer 20 in the inner periphery edge 13b of the bead portion 13 and the vicinity thereof, and the plane 71a.

Consequently, the gasket 1 in the attached state seals the gap between the plane 70a and the plane 71a, to prevent leakage of a matter such as a lubricant inside the members 70, 71 from the inner periphery side through the gap between the planes 70a, 71a, and entry of rainwater, dust, etc., from the outer periphery side through the gap between the planes 70a, 71a.

In addition, in the attached state with this full compressed state, as shown in FIG. 6, the upper side covering layer 20 in the outer periphery end portion 15b of the outer periphery portion 15 is in contact with the plane 70a without forming a gap, and the lower side covering layer 20 in the outer periphery end portion 15b of the outer periphery portion 15 is in contact with the plane 71a without or substantially without forming a gap. This is due to the outer periphery portion 15 connected to the bead portion 13, in the free state of the gasket 1, being inclined to the lower side with respect to the protruding direction line x of the bead portion 13, thus forming a tapered portion. As a result, in the attached state in the full compressed state as well, the outer periphery portion 15 is not inclined to the upper side with respect to the protruding direction line x to such a degree that the lower side covering layer 20 in the outer periphery end portion 15b, in particular in the outer periphery edge 15a, leaves the plane 71a, whereby lift of the gasket 1, in which the lower side covering layer 20 in the outer periphery end portion 15b, in particular in the outer periphery edge 15a, leaves the plane 71a, can be suppressed.

More particularly, in the free state, the outer periphery portion 15 is inclined to the lower side with respect to the protruding direction line x, whereby, even if the bead portion 13 is being compressed and reduced in height during the fastening process of the members 70, 71, the outer periphery portion 15 can maintain the state of being inclined to the lower side as shown in FIG. 5. As a result, during the fastening process of the members 70, 71, the lower side covering layer 20 in the outer periphery end portion 15b of the outer periphery portion 15 can be maintained in contact with the plane 71a. In addition, in the attached state in the full compressed state as well, the outer periphery portion 15 maintains the state of being inclined to the lower side, or the outer periphery portion 15 is in a state of being orthogonal to the protruding direction line x, or the outer periphery portion 15 is inclined to the upper side with respect to the protruding direction line x to such a degree that the lower side covering layer 20 in the outer periphery end portion 15b, in particular in the outer periphery edge 15a, does not leave the plane 71a, whereby the lower side covering layer 20 in the outer periphery end portion 15b of the outer periphery portion 15 is maintained in contact with the plane 71a. Lift of the gasket 1, in which the lower side covering layer 20 in the outer periphery end portion 15b, in particular in the outer periphery edge 15a, leaves the plane 71a is thus be prevented, whereby no gap is formed between the end portion on the outer periphery side (outer periphery end portion 15b) of the gasket 1 and the planes 70a, 71a. Meanwhile, in the attached state in the full compressed state, no gap is formed between the end portion on the outer periphery side (outer periphery end portion 15b) of the gasket 1 and the upper side plane 70a. Consequently, the gasket 1 enables prevention of formation of a space between the members 70, 71 on the outer periphery side, whereby entry of the corrosive foreign matter such as salty water and the snow melting agent to the outer periphery side of the seal lines s1, s2 can be prevented.

In addition, depending on the length of the outer periphery portion 15 in the extending direction, the inclination angle of the outer periphery portion 15 (contained angle α), the shape of the bead portion 13, and the like, in the attached state in the full compressed state, the state of the outer periphery portion 15 being inclined to the lower side cannot be maintained, or the outer periphery portion 15 cannot be in the state of being orthogonal to the protruding direction line x, whereby the outer periphery portion 15 may be in a state of being inclined to the upper side. However, since the outer periphery portion 15 forms the tapered portion inclined to the lower side in the free state as described above, lift of the outer periphery portion 15 during the compression process is suppressed as in the above-described case, even if the outer periphery portion 15 is in a state of being inclined to the upper side in the attached state in the full compressed state, the outer periphery portion 15 can be maintained in a state of not being largely inclined to the upper side with respect to the protruding direction line x. Consequently, even if a gap is formed between the end portion of the gasket 1 on the outer periphery side and the plane 71a, the gap is an extremely small space and the corrosive foreign matter does not enter the gap, or even if the corrosive foreign matter enters the gap, the amount of the foreign matter accumulating in the gap can be made extremely small. Meanwhile, in this case as well, in the attached state in the full compressed state, no gap is formed between the end portion on the outer periphery side (outer periphery end portion 15b) of the gasket 1 and the upper side plane 70a. Consequently, entry of the corrosive foreign matter to the outer periphery side of the seal lines s1, s2 can be suppressed. In addition, accumulation of the corrosive foreign matter on the outer periphery side of the seal lines s1, s2 can be suppressed, or even if the corrosive foreign matter accumulates on the outer periphery side of the seal lines s1, s2, the accumulating amount of the foreign matter can be made extremely small.

As described above, the gasket 1, by means of the outer periphery portion 15, enables reduction of a space communicating to the outside formed between the member 70 and the member 71, or elimination of such a space communicating to the outside. Consequently, according to the gasket 1, the outer periphery portion 15 enables prevention of corrosion of the planes 70a, 70b of the members 70, 71, which are the attachment targets, on the outer periphery side of the seal lines s1, s2 by the corrosive foreign matter, and prevention of breakage of the seal lines s1 to s3 due to corrosion. Consequently, deterioration of the sealing performance due to a corrosive foreign matter such as salty water and the snow melting agent can be prevented. The gasket 1 is particularly suitable for a case where the members 70, 71 are formed of an aluminum alloy such as ADC12 which is prone to corrosion by salty water and the like.

In addition, in the free state, since the outer periphery portion 15 is inclined to the lower side with respect to the protruding direction line x, the height of the gasket 1 is a sum of the height of the bead portion 13 and the height of the outer periphery portion 15 based on the inclination. Consequently, the height of the bead portion 13 of the gasket 1 is smaller than the height of the bead of the conventional gasket of the same height. The reaction force generated by the bead portion 13 in the attached state in the full compressed state can thus be reduced, whereby the fastening force for putting the members 70, 71, which are the attachment targets, into the full compressed state can be reduced.

In addition, since the inner periphery portion 14 is inclined to the lower side with respect to the protruding direction line x in a similar manner to the outer periphery portion 15, the inner periphery portion 14 acts in each of the attaching process and in the attached state in a similar manner to the above-described outer periphery portion 15, and produces an effect similar to the effect produced by the outer periphery portion 15. As a result, the gap between the planes 70a, 71a can be sealed on the inner periphery side of the seal lines s1, s3, whereby improvement of the sealing performance with respect to a sealing target on the inner periphery side is also enabled.

In addition, even if the corrosive foreign matter enters the inside over the seal line s2 on the outer periphery side, the seal line s3 of the inside can prevent further entrance of the foreign matter, whereby spread of corrosion of the member 71 by salt water and the like can be suppressed. Similarly, even if a liquid or the like leaks to the outside over the seal line s3 by the inner periphery portion 14, further leakage of the leaking liquid can be prevented by the seal line s2.

As such, the gasket 1 according to the embodiment of the present disclosure enables reduction of the reaction force of the gasket 1 in the attached state and suppression of deterioration of the sealing performance due to a corrosive foreign matter such as salty water and the snow melting agent.

As described above, the attitude of the outer periphery portion 15 in the attached state is changed depending on the length of the outer periphery portion 15 in the extending direction, the inclination angle of the outer periphery portion 15 (contained angle α), the shape of the bead portion 13, and the like in the free state. Therefore, it is preferred that the length of the outer periphery portion 15 in the extending direction, the inclination angle of the outer periphery portion 15, the shape of the bead portion 13, and the like in the free state are defined such that the outer periphery portion 15 maintains the state of being inclined to the lower side, or such that the outer periphery portion 15 is in a state of being orthogonal to the protruding direction line x, or such that the outer periphery portion 15 is inclined to the upper side with respect to the protruding direction line x to such a degree that the lower side covering layer 20 in the outer periphery end portion 15b, in particular in the outer periphery edge 15a, does not leave the plane 71a, in the attached state. The same applies to the inner periphery portion 14.

Figure 7:
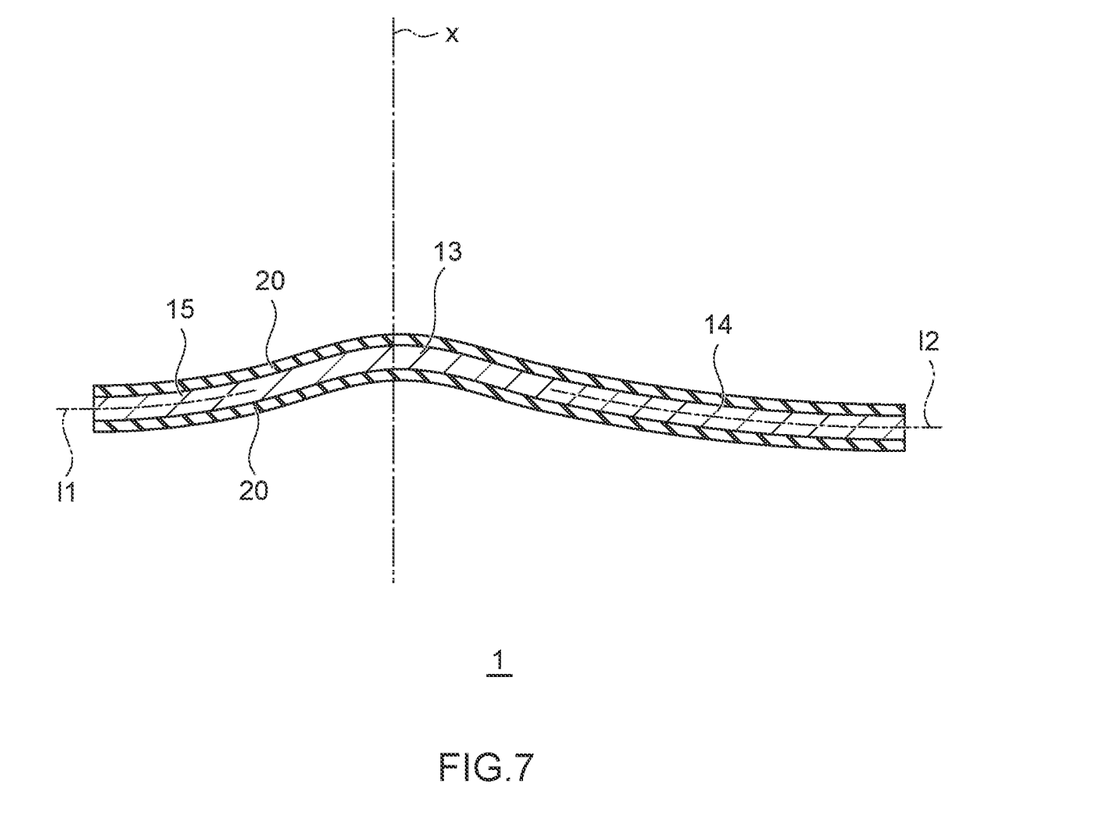
FIG. 7 is a cross-sectional view along the line A-A illustrating a modification of the gasket according to the first embodiment of the present disclosure.

Next, a modification of the above-described gasket 1 according to the embodiment of the present disclosure is described. FIG. 7 is a cross-sectional view along the line A-A illustrating a modification of the gasket 1. As shown in FIG. 7, the outer periphery portion 15 may extend along a curved face curved to protrude to the lower side, not along a plane. Specifically, the outer periphery portion 15 may extend along a curved face protruding toward the lower side, having a curvature smaller than a curvature of the bead portion 13 in the cross section. In other words, as shown in FIG. 7, the extending direction line l1 of the outer periphery portion 15 may form a curved line which is convex to the lower side. However, the degree of curve of the outer periphery portion 15, for example the curvature of the extending direction line l1, is configured such that the gasket 1 does not lift as described above. In addition, as shown in FIG. 7, the inner periphery portion 14 may also extend along a curved face curved to protrude to the lower side, in a similar manner to the outer periphery portion 15 in the present modification. The gasket 1 produces the above-described effect in this case as well.

Alternatively, the outer periphery portion 15 may extend along a curved face curved to protrude to the upper side, not along a plane, in an opposite direction to the protruding direction of the outer periphery portion 15 shown in FIG. 7. Specifically, the outer periphery portion 15 may extend along a curved face protruding toward the upper side, having a curvature smaller than a curvature of the bead portion 13 in the cross section. Also in this case, the degree of curve of the outer periphery portion 15, for example the curvature of the extending direction line l1, is configured such that the gasket 1 does not lift as described above. In addition, the inner periphery portion 14 may also extend along a curved face curved to protrude to the upper side, in a similar manner. The gasket 1 produces the above-described effect in this case as well. Yet alternatively, one of the inner periphery portion 14 and the outer periphery portion 15 may extend along a curved face curved to protrude to the upper side, and the other may extend along a curved face curved to protrude to the lower side.

Figure 8:
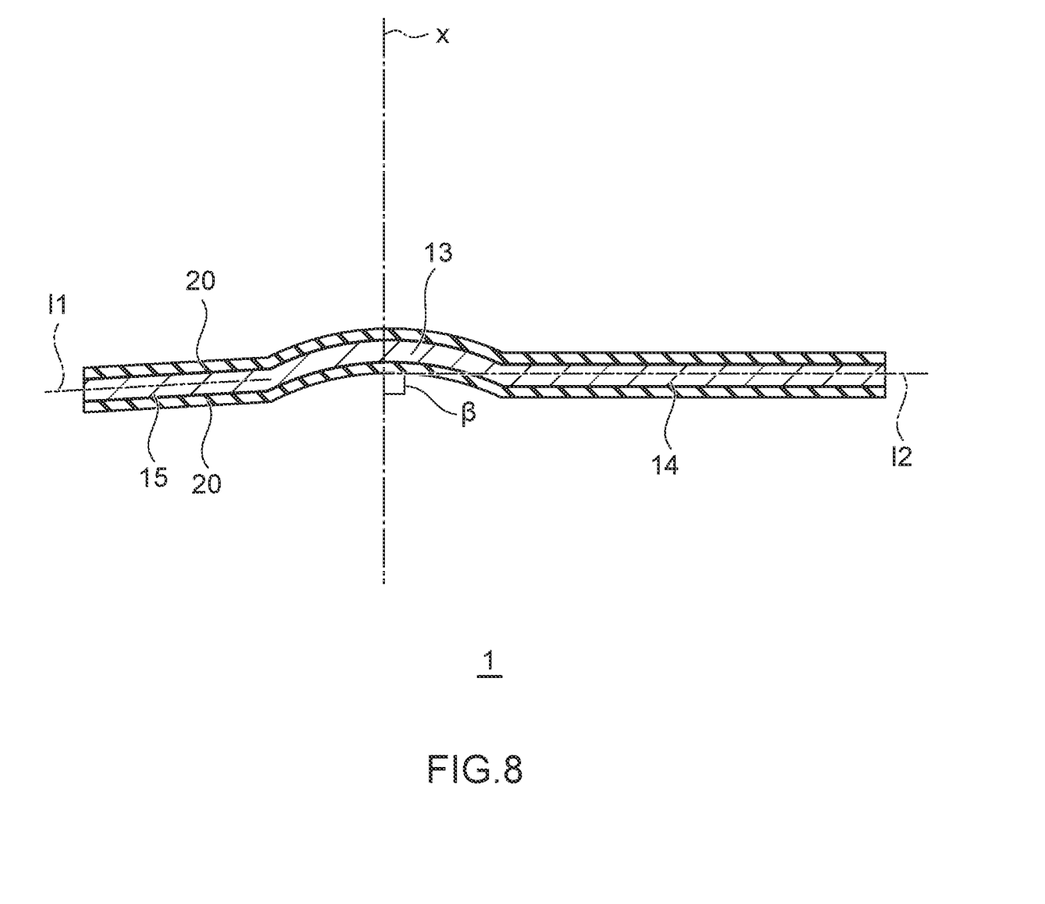
FIG. 8 is a cross-sectional view along the line A-A illustrating another modification of the gasket according to the first embodiment of the present disclosure.

In addition, as shown in FIG. 8, the inner periphery portion 14 of the gasket 1 in the free state may extend along a plane orthogonal or substantially orthogonal to the protruding direction line x, without forming the tapered portion. In other words, in the gasket 1 in the free state, the contained angle β between the extending direction line l2 of the inner periphery portion 14 and the protruding direction line x may be 90° or substantially 90°. The outer periphery portion 15 of the gasket 1 produces the above-described effect in this case as well. Yet alternatively, one of the inner periphery portion 14 and the outer periphery portion 15 may extend in a planar manner as described above (see FIG. 2), and the other may extend in a curved manner as described above (see FIG. 7).

The embodiment of the present disclosure has been described in the foregoing; however, the present disclosure is not limited to the embodiment of the present disclosure and encompasses all modes included in the concept of the present disclosure and the claims. In addition, the configurations may be selectively combined so as to produce at least a part of the above-described effect. For example, the shape, material, arrangement, size, manufacturing method, and the like of each of the constitutive elements in the above-described embodiment may be changed as appropriate according to a specific usage mode of the present disclosure.

For example, the covering layer 20 may not be provided on the respective entirety of the upper face 11 and the lower face 12 of the metal base plate 10 as described above, and the covering layer 20 may be provided on only a part of the upper face 11 or the lower face 12, or the covering layer 20 may be provided on only a part of each of the upper face 11 and the lower face 12. Also in this case, the covering layer 20 is provided on the upper face 11 and the lower face 12, in the outer periphery end portion 15b of the outer periphery portion 15, and where the seal lines s1 to s3 are formed.

The invention claimed is:

1. A gasket comprising:
a metal base plate made of metal, and
a covering layer formed of an elastic body that covers at least a part of the metal base plate,
wherein the metal base plate comprises a pair of faces that are back-to-back to each other, a bead portion which is a portion protruding toward a side facing one face of the pair of faces, an inner periphery portion located immediately adjacent the bead portion which is a portion extending from an edge on an inner periphery side of the bead portion to a terminal edge of an opening of the metal base plate located on the inner periphery side of the bead portion, and an outer periphery portion located immediately adjacent to the bead portion and extending from an edge on an outer periphery side of the bead portion to a terminal edge of the metal base plate on the outer periphery side of the bead portion;
an entirety of the outer periphery portion extends toward a side facing another face of the pair of faces in an oblique manner with respect to a protruding direction of the bead portion; and
an entirety of the inner periphery portion extends toward the side facing another face of the pair of faces in the oblique manner with respect to the protruding direction of the bead portion.

2. The gasket according to claim 1, wherein the outer periphery portion extends along a plane.

3. The gasket according to claim 1, wherein the outer periphery portion extends along a curved face protruding toward the side facing the other face, having a curvature smaller than a curvature of the bead portion.

4. The gasket according to claim 1, wherein the inner periphery portion extends toward the side facing the other face of the pair of faces, in an oblique manner with respect to the protruding direction of the bead portion.

5. The gasket according to claim 4, wherein at least a part of the inner periphery portion is formed in a symmetric manner to at least a part of the outer periphery portion with respect to the bead portion.

6. The gasket according to claim 1, wherein the elastic body covers an entirety of each face of the pair of faces.

* * * * *